(12) United States Patent
Ogawa et al.

(10) Patent No.: US 11,978,885 B2
(45) Date of Patent: May 7, 2024

(54) ELECTRODE FOR NONAQUEOUS ELECTROLYTE SECONDARY BATTERIES, AND NONAQUEOUS ELECTROLYTE SECONDARY BATTERY PROVIDED WITH SAME

(71) Applicants: HONDA MOTOR CO., LTD., Tokyo (JP); NICHIA CORPORATION, Anan (JP)

(72) Inventors: Atsushi Ogawa, Wako (JP); Toru Sukigara, Wako (JP); Hiroto Maeyama, Wako (JP); Soshi Kawamura, Wako (JP); Kenichi Kobayashi, Anan (JP)

(73) Assignees: HONDA MOTOR CO., LTD., Tokyo (JP); NICHIA CORPORATION, Anan (JP)

(*) Notice: Subject to any disclaimer, the term of this patent is extended or adjusted under 35 U.S.C. 154(b) by 0 days.

(21) Appl. No.: 17/493,901

(22) Filed: Oct. 5, 2021

(65) Prior Publication Data

US 2022/0029147 A1    Jan. 27, 2022

Related U.S. Application Data

(63) Continuation of application No. 16/347,655, filed as application No. PCT/JP2017/039698 on Nov. 2, 2017, now Pat. No. 11,165,051.

(30) Foreign Application Priority Data

Nov. 8, 2016  (JP) ................................ 2016-217973

(51) Int. Cl.
*H01M 4/131*   (2010.01)
*H01M 4/02*    (2006.01)
(Continued)

(52) U.S. Cl.
CPC ........... *H01M 4/131* (2013.01); *H01M 4/366* (2013.01); *H01M 4/505* (2013.01); *H01M 4/525* (2013.01);
(Continued)

(58) Field of Classification Search
CPC ...... H01M 4/131; H01M 4/366; H01M 4/505; H01M 4/525; H01M 10/0525; H01M 2004/028
See application file for complete search history.

(56) References Cited

U.S. PATENT DOCUMENTS 9,627,711 B2 *  4/2017  Nagai ..................... B60L 58/21
2006/0134521 A1  6/2006  Shima
(Continued)

FOREIGN PATENT DOCUMENTS

EP    2128915 B1    5/2016
EP    3225592 A1    10/2017
(Continued)

OTHER PUBLICATIONS

International Search Report dated Dec. 12, 2017, issued in counterpart International Application No. PCT/JP2017/039698 (1 page).
(Continued)

*Primary Examiner* — Matthew J Merkling

(57) ABSTRACT

An electrode for nonaqueous electrolyte secondary batteries, provided with a collector and a positive electrode active material layer arranged on the collector and contains a positive electrode active material. The positive electrode active material contains compound particles which have a layered structure composed of two or more transition metals, and which have an average particle diameter DSEM of from 1 μm to 7 μm (inclusive) based on the observation with an electron microscope, a ratio of the 50% particle diameter D50 in a volume-based cumulative particle size distribution (Continued)

PRESENT EMBODIMENT (SINGLE PARTICLE)

to the average particle diameter DSEM, namely D50/DSEM of from 1 to 4 (inclusive), and a ratio of the 90% particle diameter D90 in the volume-based cumulative particle size distribution to the 10% particle diameter D10 in the volume-based cumulative particle size distribution, namely D90/D10 of 4 or less. The positive electrode active material layer has a void fraction of 10-45%.

12 Claims, 8 Drawing Sheets

(51) Int. Cl.
 *H01M 4/36* (2006.01)
 *H01M 4/505* (2010.01)
 *H01M 4/525* (2010.01)
 *H01M 10/0525* (2010.01)
(52) U.S. Cl.
 CPC .. *H01M 10/0525* (2013.01); *H01M 2004/028* (2013.01)

(56) References Cited

U.S. PATENT DOCUMENTS

| | | | |
|---|---|---|---|
| 2007/0072082 A1* | 3/2007 | Scott | H01M 4/043 429/231.95 |
| 2008/0131778 A1 | 6/2008 | Watanabe et al. | |
| 2009/0104530 A1 | 4/2009 | Shizuka et al. | |
| 2013/0288121 A1 | 10/2013 | Nagai et al. | |
| 2013/0316210 A1 | 11/2013 | Morita et al. | |
| 2014/0134491 A1 | 5/2014 | Sugimoto et al. | |
| 2015/0188132 A1* | 7/2015 | Takamori | H01M 10/0587 429/223 |
| 2016/0020487 A1 | 1/2016 | Yamada et al. | |
| 2016/0056450 A1* | 2/2016 | Yoshikawa | H01M 4/131 429/224 |
| 2017/0187031 A1 | 6/2017 | Kurita et al. | |
| 2017/0237069 A1* | 8/2017 | Takamori | C01G 53/50 429/223 |
| 2017/0288222 A1 | 10/2017 | Kobayashi | |

FOREIGN PATENT DOCUMENTS

| | | |
|---|---|---|
| JP | 2003-123748 A | 4/2003 |
| JP | 2004-355824 A | 12/2004 |
| JP | 2009-48876 A | 3/2009 |
| JP | 2010-15904 A | 1/2010 |
| JP | 2010-47466 A | 3/2010 |
| JP | 2012-209161 A | 10/2012 |
| JP | 2013-201077 A | 10/2013 |
| JP | 2015-43335 A | 3/2015 |
| KR | 10-1415590 | 6/2014 |
| WO | 2012/176471 A1 | 12/2012 |
| WO | 2015/075520 A2 | 5/2015 |
| WO | 2015/182665 A1 | 12/2015 |

OTHER PUBLICATIONS

Extended (Supplementary) European Search Report dated May 25, 2020, issued in counterpart application No. 17869652.2. (7 pages).
Office Action dated Feb. 17, 2021, issued in counterpart IN Application No. 201947021869, with English translation (5 pages).

* cited by examiner

PRESENT EMBODIMENT (SINGLE PARTICLE)

CONVENTIONAL CASE (SECONDARY PARTICLE)

ELECTRODE FOR NONAQUEOUS ELECTROLYTE SECONDARY BATTERIES, AND NONAQUEOUS ELECTROLYTE SECONDARY BATTERY PROVIDED WITH SAME

TECHNICAL FIELD

The present invention relates to an electrode for nonaqueous electrolyte secondary batteries, and a nonaqueous electrolyte secondary battery provided with the same.

BACKGROUND ART

Conventionally, for use in large-sized power machines such as electric vehicles, there has been a demand for a positive electrode active material for nonaqueous electrolyte secondary batteries having high output characteristics. In order to obtain high output characteristics, it is effective to decrease the number of primary particles in secondary particle for constituting the positive electrode active material, or to constitute the positive electrode active material with single particles that are obtained by single dispersion of primary particles.

However, once cracks are generated in the positive electrode active material due to the pressurization treatment for forming an electrode, expansion and shrinkage upon charge and discharge, or the like, the high output characteristics are not obtained. Due to this reason, various techniques for enhancing the durability of a positive electrode active material have been suggested.

For example, a nonaqueous secondary battery provided with a positive electrode active material, which has high density like density of 3.5 g/cm³ or more and a void fraction of 25% or less, is suggested (see, Patent Document 1). According to this nonaqueous secondary battery, it is indicated that, by allowing the presence of many voids in a positive electrode, breakage of a collector can be avoided in spite of the high density, and high output characteristics are obtained accordingly.

Furthermore, a positive electrode for secondary batteries having a void fraction of 30 to 50% and pore diameter of 0.09 to 0.30 μm is suggested, for example (see, Patent Document 2). It is indicated that, according to this positive electrode for secondary batteries, electrode density can be improved by having the void fraction and pore diameter within a suitable range so that the output characteristics can be enhanced.

Furthermore, a secondary battery provided with a positive electrode active material in which a ratio of the volume of a pore having pore diameter of 0.01 to less than 0.1 μm relative to the volume of a pore having pore diameter of 0.1 to 1.0 μm is 0.3 or less is suggested, for example (see, Patent Document 3). It is indicated that, according to this secondary battery, the output characteristics can be enhanced by having suitable pore distribution.

Patent Document 1: Japanese Unexamined Patent Application, Publication No. 2009-48876
Patent Document 2: Japanese Unexamined Patent Application, Publication No. 2010-15904
Patent Document 3: Japanese Unexamined Patent Application, Publication No. 2012-209161

DISCLOSURE OF THE INVENTION

Problems to be Solved by the Invention

However, the techniques of Patent Documents 1 to 3 all use secondary particles, and, in actual cases, the secondary particles constituting the positive electrode active material are collapsed during press molding of a positive electrode or the like, and also, as a result of having high resistance due to reduced void diameter, the high output characteristics are not obtained. In particular, once cracks are generated in a positive electrode active material, the electrolyte liquid on a freshly formed surface is decomposed by oxidation, and, as a result of forming a thick SEI, the high output characteristics are not obtained.

The present invention is achieved in view of the problems that are described above, and object of the present invention is to provide an electrode for nonaqueous electrolyte secondary batteries from which high output characteristics can be obtained, and a nonaqueous electrolyte secondary battery provided with the electrode.

Means for Solving the Problems

To achieve the object described above, the present invention provides an electrode for nonaqueous electrolyte secondary batteries including a collector and a positive electrode active material layer that is arranged on the collector and contains a positive electrode active material, in which the positive electrode active material is configured to contain compound particles which have a layered structure composed of two or more transition metals, and which have an average particle diameter DSEM of 1 to 7 μm based on the observation with an electron microscope, a ratio of the 50% particle diameter D50 in a volume-based cumulative particle size distribution to the average particle diameter DSEM (D50/DSEM) of 1 to 4, and a ratio of the 90% particle diameter D90 in the volume-based cumulative particle size distribution to the 10% particle diameter D10 in the volume-based cumulative particle size distribution (D90/D10) of 4 or less, and the positive electrode active material layer has a void fraction of 10 to 45%.

The positive electrode active material layer preferably has density of 2.7 to 3.9 g/cm³. Accordingly, even higher output characteristics are obtained. When a secondary particle is pressed, cracks are generated so that a portion not applied with an aid becomes a surface, but, in the case of a single particle, cracks are not generated from the beginning, and thus the output characteristics are relatively high.

With regard to the positive electrode active material layer, a peak diameter of a void in a void distribution curve is preferably 0.06 to 0.3 μm.

With regard to the positive electrode active material layer, an average diameter of the void is preferably 0.03 to 0.2 μm.

With regard to the positive electrode active material layer, a ratio of the peak diameter of the void to the average diameter of the void (peak diameter/average diameter) is preferably 1.1 to 2.4.

The positive electrode active material preferably has Ni, Mn, or Al as a main component.

A nonaqueous electrolyte secondary battery including the electrode for nonaqueous electrolyte secondary batteries is provided.

Effects of the Invention

According to the present invention, an electrode for nonaqueous electrolyte secondary batteries which enables obtainment of output characteristics that are higher than before, and a nonaqueous electrolyte secondary battery provided with the electrode can be provided.

PREFERRED MODE FOR CARRYING OUT THE INVENTION

Figure 1:
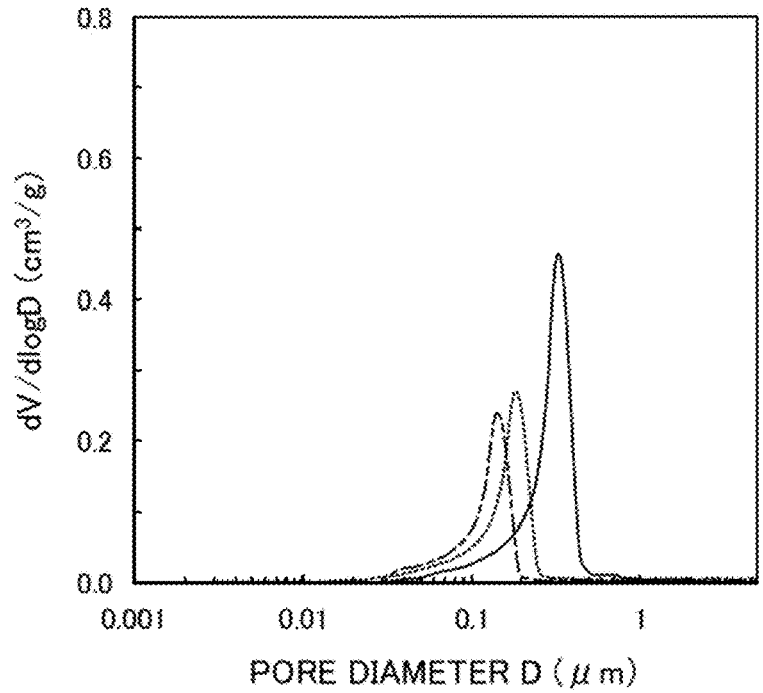
FIG. 1 is a graph showing an exemplary void distribution curve of a positive electrode active material according to the present embodiment.

One embodiment of the present invention is described in detail in view of the drawings. However, the present invention is not limited to the following embodiments. Furthermore, in the present specification, the content of each component means, in a case in which a plurality of substances corresponding to each component are present in the composition, the total amount of the plurality of substances present in the composition unless specifically described otherwise.

[Electrode for Nonaqueous Electrolyte Secondary Batteries]

The electrode for nonaqueous electrolyte secondary batteries according to the present embodiment is provided with a collector and an electrode active material layer that is arranged on the collector and contains an active material. The electrode for nonaqueous electrolyte secondary batteries according to the present embodiment is preferably used as a positive electrode of a nonaqueous electrolyte secondary battery, and it is particularly preferably used as a positive electrode of a lithium ion secondary battery. Due to this reason, a positive electrode for nonaqueous electrolyte secondary batteries in which the electrode for nonaqueous electrolyte secondary batteries according to the present embodiment is used as a positive electrode of a lithium ion secondary battery is described in detail hereinbelow.

The positive electrode for nonaqueous electrolyte secondary batteries according to the present embodiment is provided with a collector and a positive electrode active material layer that is arranged on the collector and contains a positive electrode active material. As for the collector, aluminum, nickel, stainless steel, or the like can be used, for example. The positive electrode active material layer is constituted by containing, other than the positive electrode active material, an electrically conductive aid, a binder, and the like.

The positive electrode active material layer according to the present embodiment has a void fraction of 10 to 45%. As it is described below, because the positive electrode active material layer according to the present embodiment is constituted with a positive electrode active material composed of single particles, a route (path) for having the diffusion of lithium ions is maintained at sufficient level and also, even when the void fraction is reduced to a range of 10 to 45% according to high-densification of the positive electrode active material layer to have even higher output characteristics, cracks are not generated in the positive electrode active material layer. Namely, because a portion not coated (adhered) with an electrically conductive aid does not newly become a surface (yield a new surface) due to an occurrence of cracks resulting from high-densification like the positive electrode active materials composed of secondary particles of a related art and also the constitution according to the present embodiment includes single particles of which surfaces are entirely coated with an electrically conductive aid, high output characteristics are obtained. More preferred void fraction is 20 to 35%.

Herein, the void fraction according to the present embodiment can be measured by a mercury intrusion porosimetry. Furthermore, the void fraction can be adjusted by adjusting the particle diameter of a positive electrode active material or adjusting the pressurizing conditions in the method for producing a positive electrode active material layer which is described later.

The positive electrode active material layer according to the present embodiment preferably has density of 2.7 to 3.9 g/cm$^3$. As it is described above, since the positive electrode active material layer according to the present embodiment is constituted with a positive electrode active material which is composed of single particles, even when high-densification of the positive electrode active material layer is carried out within a range of 2.7 to 3.9 g/cm$^3$ to have high output characteristics, cracks are not generated in the positive electrode active material layer as the void fraction is limited within a range of 10 to 45%. Namely, because a portion not coated (adhered) with an electrically conductive aid does not newly become a surface (yield a new surface) due to an occurrence of cracks resulting from high-densification like the positive electrode active materials composed of secondary particles of a related art and also the constitution according to the present embodiment includes single particles of which surfaces are entirely coated with an electrically conductive aid, high output characteristics are obtained. More preferred density is 3.0 to 3.6 g/cm$^3$.

Herein, the density according to the present embodiment can be measured by a device for measuring density. Furthermore, the density can be adjusted by adjusting the particle diameter of a positive electrode active material or adjusting the pressurizing conditions in the method for producing a positive electrode active material layer which is described later.

With regard to the positive electrode active material layer according to the present embodiment, the peak diameter of a void in a void distribution curve (pore distribution curve) is preferably 0.06 to 0.3 μm. As the peak diameter of a void in a positive electrode active material layer is within this range, the high output characteristics as described above can be more surely obtained. More preferred peak diameter of a void is 0.12 to 0.25 μm.

The peak diameter of a void according to the present embodiment means the diameter D of a pore which is the highest in a void distribution curve obtained from a measurement by mercury intrusion porosimetry like the measurement of the void fraction described above, in greater detail, the highest in a log differential pore volume distribution (dV/dlogD). The log differential pore volume distribution (dV/dlogD) indicates a plot that is obtained by plotting, with respect to the average pore diameter, a value obtained by dividing the differential pore volume dV by log differential value dlogD of pore diameter.

Figure 2:
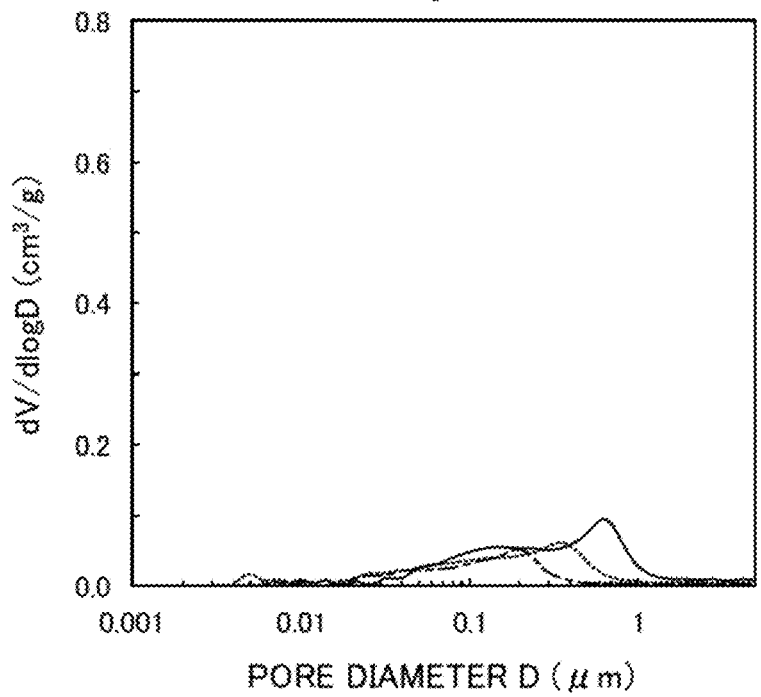
FIG. 2 is a graph showing an exemplary void distribution curve of a positive electrode active material that is constituted with secondary particles of a related art.

Herein, FIG. 1 is a graph showing an exemplary void distribution (log differential pore volume distribution) curve of the positive electrode active material according to the present embodiment. Furthermore, FIG. 2 is a graph showing an exemplary void distribution (log differential pore volume distribution) curve of the positive electrode active material that is constituted with secondary particles of a related art. In those FIG. 1 and FIG. 2, the horizontal axis represents the pore diameter D (μm) and the vertical axis represents the log differential pore volume distribution (dV/dlogD). In any of those graphs, three examples are shown with a solid line, a broken line, and a one-dotted chain line, respectively. As it is evident from those figures, it is recognized that a sharp peak is confirmed from the present embodiment in which a positive electrode active material composed of single particles is used, while a broad peak is confirmed from a conventional case in which a positive electrode active material composed of secondary particles is used.

The positive electrode active material layer according to the present embodiment preferably has the average diameter of a void of 0.03 to 0.2 μm. As the average diameter of a void in the positive electrode active material layer is within this range, the high output characteristics as described above can be more surely obtained. More preferred average diameter of a void is 0.05 to 0.18 μm. Furthermore, the average diameter of a void is obtained from a measurement by mercury intrusion porosimetry according to the same measurement conditions as the measurement of a void fraction described above.

Furthermore, with regard to the positive electrode active material layer according to the present embodiment, a ratio of the peak diameter of a void to the average diameter of a void (peak diameter/average diameter) is preferably 1.1 to 2.4. As the ratio of the peak diameter of a void to the average diameter of a void (peak diameter/average diameter) is within this range, the high output characteristics as described above can be more surely obtained. More preferred ratio of the peak diameter of a void to the average diameter of a void (peak diameter/average diameter) is 1.1 to 1.8.

By using a positive electrode active material composed of single particles like the present embodiment, a small value of the peak diameter/average diameter is yielded, falling within the above range. Due to this reason, a gap between the particles is not excessively reduced and an electrolyte liquid can smear in the whole, and thus high output characteristics are obtained.

The positive electrode active material layer is formed by, after applying a positive electrode mixture obtained by mixing the positive electrode active material, an electrically conductive aid, a binder, and the like with a solvent onto a collector, a drying and pressurization treatment. Examples of the electrically conductive aid which can be used include natural graphite, artificial graphite, and acetylene black. Examples of the binder which can be used include polyvinylidene fluoride, polytetrafluoroethylene, and a polyamide acrylic resin.

Next, the positive electrode active material is described in detail. The positive electrode active material according to the present embodiment is constituted by containing compound particles which have a layered structure composed of two or more transition metals, and which have an average particle diameter DSEM of 1 to 7 μm based on the observation with an electron microscope, a ratio of the 50 particle diameter D50 in a volume-based cumulative particle size distribution to the average particle diameter DSEM (D50/DSEM) of 1 to 4, and a ratio of the 90% particle diameter D90 in the volume-based cumulative particle size distribution to the 10, particle diameter D10 in the volume-based cumulative particle size distribution (D90/D10) of 4 or less.

The compound particles which have a layered structure composed of two or more transition metals preferably have, as a main component, Ni, Mn, or Al. Among them, lithium transition metal composite oxide particles having a layered structure and containing Ni (hereinbelow, also described as "composite oxide particles") are preferably used.

DSEM of 1 to 7 μm and also D50/DSEM of 1 to 4 means that the composite oxide particles constituting the positive electrode active material are either single particles composed of particles of a single kind or particles composed of only few primary particles. Namely, in the present embodiment, both cases in which the entire particles are single particles or particles constituted with only few primary particles are referred to as "single particles". Furthermore, the positive electrode active material according to the present embodiment preferably has a single particle active material ratio of 80% or higher.

Figure 3:
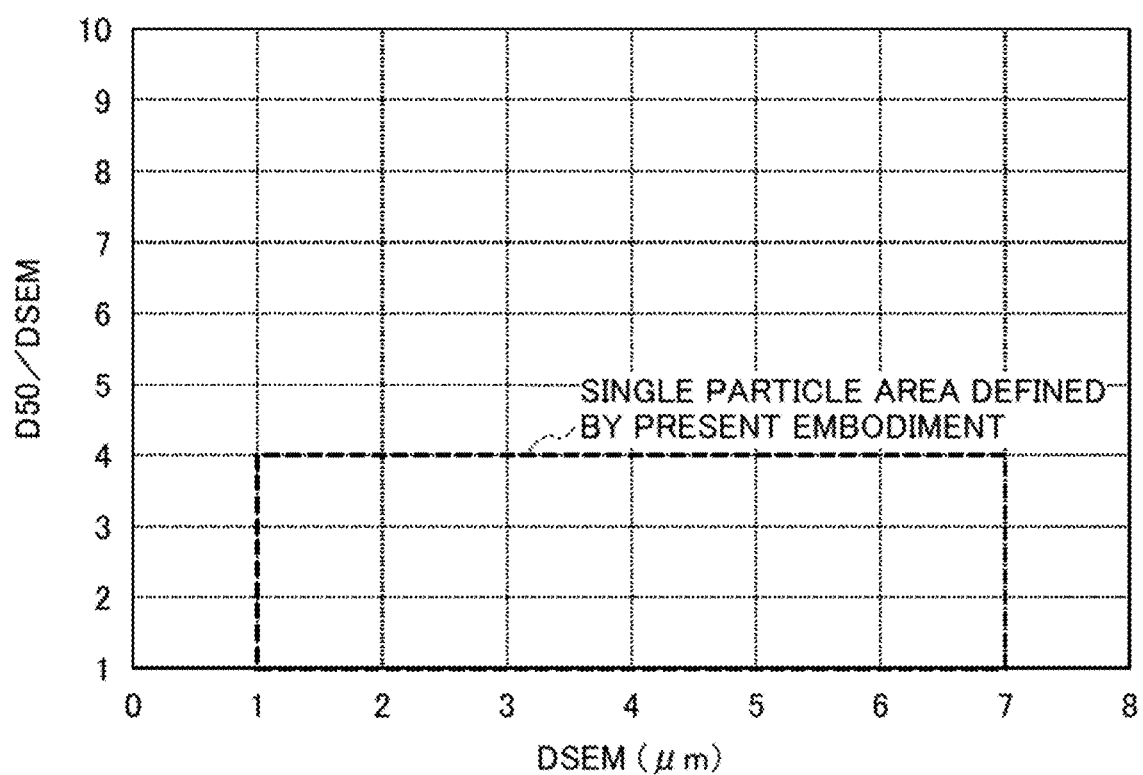
FIG. 3 is a graph showing the relationship between DSEM and D50/DSEM of the positive electrode active material according to the present embodiment.

Herein, FIG. 3 is a graph showing the relationship between DSEM and D50/DSEM of the positive electrode active material according to the present embodiment. In FIG. 3, the horizontal axis represents DSEM (μm) and the vertical axis represents D50/DSEM. In FIG. 3, the area surrounded by a broken line represents the area of single particles defined by the present embodiment in which DSEM is 1 to 7 μm and also D50/DSEM is 1 to 4. The single particle present within this area has, compared to a secondary particle that is formed by aggregation of primary particles, less particle boundary at which the primary particles are in contact with each other.

Figure 4:
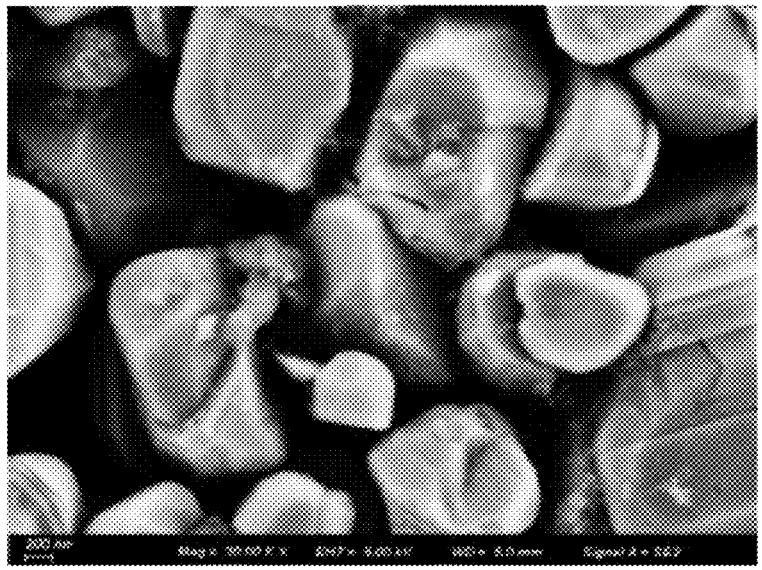
FIG. 4 is an SEM image of the positive electrode active material according to the present embodiment.
Figure 5:
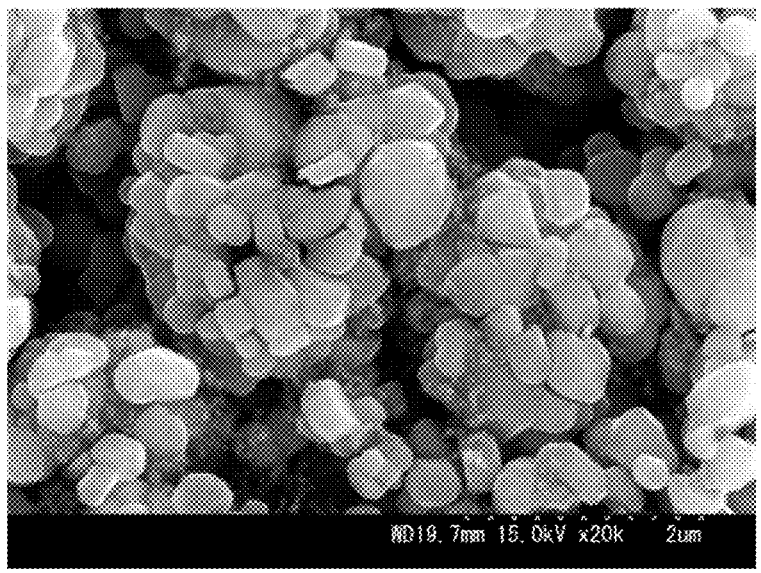
FIG. 5 is an SEM image of the positive electrode active material that is constituted with the secondary particles of a related art.

FIG. 4 is an SEM image of the positive electrode active material according to the present embodiment. FIG. 5 is an SEM image of the positive electrode active material that is constituted with secondary particles of a related art. As it is shown in FIG. 4, the single particles constituting the positive electrode active material according to the present embodiment have no aggregation of particles, and thus the entire surface of each particle can be coated by (adhered with) an electrically conductive aid. Due to this reason, the electrically conductive aid can be used at good efficiency, and the output characteristics can be enhanced. On the other hand, with regard to the secondary particles constituting the positive electrode active material of a related art as they are shown in FIG. 5, the secondary particles are formed as a result of aggregation of primary particles so that the electrically conductive aid cannot enter a gap between the primary particles, and thus the entire surface of the primary particle cannot be coated by (adhered with) an electrically conductive aid. Due to this reason, the electrically conductive aid cannot be used at good efficiency, and the output characteristics cannot be enhanced.

Furthermore, D90/D10 of 4 or less means that, in the volume-based cumulative particle size distribution of composite oxide particles, the distribution width is narrow and the particle size is uniform. As a result of obtaining high durability by having those characteristics, high output characteristics are obtained.

Herein, as compared with a positive electrode active material containing lithium transition metal composite oxide particles composed of secondary particles in which primary particles are aggregated in a large number, in a conventional positive electrode active material containing lithium transition metal composite oxide particles composed of single particles, a decrease in capacity retention ratio due to the disconnection of the electrical conduction path of lithium ions caused by the particle boundary dissociation of secondary particles during a charge/discharge cycle is suppressed, and also an increase in the diffusion/migration resistance of lithium ions is suppressed, and thus excellent durability is exhibited. Meanwhile, a three-dimensional particle boundary network as in a positive electrode active material composed of aggregated particles is hardly formed, and a high output design utilizing particle boundary conduction is difficult to achieve, and thus there has been a tendency that the output characteristics are insufficient. It is considered that, to have high output characteristics, the improvement can be obtained by decreasing the particle size (DSEM) of single particles. However, in a case in which the particle size is too small, the interaction between powders increases and the electrode plate filling properties tend to be greatly deteriorated, and, due to a decrease in powder fluidity, the handling property may be greatly deteriorated. Meanwhile, in particular, for obtaining a practical energy density, the particle size at certain level is needed, but, it is considered that an increase in particle size tends to result in a more significant deficiency of output.

As the lithium transition metal composite oxide particles according to the present embodiment have more uniform particle size than that of conventional single particles, even in a case in which charge/discharge is carried out at a high current density, variations in charge/discharge depth among particles due to current concentration on some particles can be suppressed, and it is accordingly considered that, while suppressing an increase in resistance due to current concentration, local degradation through the cycle can be suppressed.

Furthermore, with uniform particle size of lithium transition metal composite oxide particles having reduced particle boundaries, the particles do not collapse even when pressed at a high pressure during the manufacturing of an electrode, and thus it is considered that a uniform void between particles can be obtained. In addition, in a case in which a battery is formed, the void between particles is filled with an electrolyte to serve as a path for lithium ion diffusion, but, with uniform size of such a path for diffusion, it is considered that variations in amount of charge/discharge among particles can be reduced. Accordingly, it is considered that, even lithium transition metal composite oxide particles having reduced contact particle boundaries between primary particles can achieve good output characteristics while ensuring electrode plate filling properties.

Furthermore, generally, in a case in which single particles are synthesized, a heat treatment is needed to be performed under high temperature for growth of particles. In particular, in a composition having a high Ni proportion, when calcination is performed at a high temperature, the Ni element may be incorporated into the Li site, that is, so-called disorder may occur. The disorder inhibits the diffusion of Li ions in composite oxide particles and causes resistance, showing an influence such as a decrease in charge/discharge capacity at a practical current density, a decrease in output characteristics, and the like, and thus it is preferable that such disorder is suppressed. Suppressing the disorder allows achievement of more excellent capacity and output characteristics in single particles.

In the composite oxide particles constituting the positive electrode active material, the average particle diameter DSEM based on electron microscopic observation is 1 to 7 µm in view of durability. Furthermore, in view of output density and the electrode plate filling properties, the DSEM is preferably 1.1 µm or more and more preferably 1.3 µm or more, and is preferably 4 µm or less and more preferably 2 µm or less in a case in which x to be described later is in a range of $0.3 \leq x < 0.6$. Furthermore, in a case in which x is in a range of $0.6 \leq x \leq 0.95$, the DSEM is preferably 1.1 µm or more and more preferably 1.3 µm or more, and is preferably 5 µm or less and more preferably 4 µm or less.

The average particle diameter DSEM based on electron microscopic observation is determined as follows: a scanning electron microscope (SEM) is used, observation is performed at a magnification of 1000 to 10000 in accordance with the particle diameter, 100 particles having recognizable particle outlines are selected, the equivalent spherical diameters of the selected particles are calculated using an image processing software, and the arithmetic average of the obtained equivalent spherical diameters is determined as DSEM.

The composite oxide particle has a ratio D50/DSEM of the 50% particle diameter D50 in a volume-based cumulative particle size distribution to the average particle diameter DSEM based on electron microscopic observation of 1 to 4. In a case in which D50/DSEM is 1, it means that all are single particles, and as D50/DSEM is closer to 1, it means that the number of the constituting primary particles is small. In view of the durability, it is preferable that D50/DSEM is 1 or more but less than 4, and in view of the output density, it is preferably 3 or less, and particularly preferably 2.5 or less.

Furthermore, the 50% particle diameter D50 of the composite oxide particles is, for example, 1 to 21 µm, and, in view of the output density, it is preferably 1.5 µm or more and more preferably 3 µm or more, and it is preferably 8 µm or less and more preferably 5.5 µm or less.

The 50, particle diameter D50 is obtained as a particle diameter corresponding to a cumulative percentage of 50% from the smaller particle diameter side in the volume-based cumulative particle size distribution that is measured under wet conditions using a laser diffraction particle size distribution analyzer. Similarly, the 90% particle diameter D90 and the 10% particle diameter D10 described below are determined as particle diameters corresponding to cumulative percentages of 90% and 10%, respectively, from the smaller particle diameter side.

With regard to the composite oxide particle, the ratio of the 90% particle diameter D90 to the 10% particle diameter D10 in the volume-based cumulative particle size distribution represents a spread of the particle size distribution, in which smaller ratio indicates more uniform particle diameter of a particle. D90/D10 is 4 or less, and in view of the output density, it is preferably 3 or less, and more preferably 2.5 or less. The lower limit of D90/D10 is 1.2 or more, for example.

The lithium transition metal composite oxide has a layered structure having Ni included in the composition. Examples of lithium transition metal composite oxide include lithium nickel composite oxide and lithium nickel cobalt manganese composite oxide. Among them, the lithium transition metal composite oxide preferably has a composition represented by the following formula (1).

[Chem. 1]

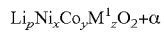

$$Li_pNi_xCo_yM^1_zO_2+\alpha \quad \text{Formula (1)}$$

[in the formula (1), p, x, y, z, and α satisfy $1.0 \leq p \leq 1.3$, $0.3 \leq x \leq 0.95$, $0 \leq y \leq 0.4$, $0 \leq z \leq 0.5$, $x+y+z=1$, and $-0.1 \leq \alpha \leq 0.1$, and $M^1$ represents at least one of Mn and Al].

The lithium transition metal composite oxide particle may be doped with an element other than the elements forming the lithium transition metal composite oxide. Examples of an element for doping include B, Na, Mg, Si, P, S, K, Ca, Ti, V, Cr, Zn, Sr, Y, Zr, Nb, Mo, In, Sn, Ba, La, Ce, Nd, Sm, Eu, Gd, Ta, W, and Bi. Among them, Mg, Ti, and W are preferably exemplified. Examples of compounds used for doping these elements include oxides and fluorides containing at least one element selected from the group consisting of these elements, and Li composite oxides thereof. The amount of doping may be, for example, 0.005% by mol or more and 10% by mol or less with respect to the lithium transition metal composite oxide particles, for example.

Furthermore, the lithium transition metal composite oxide particles may include core particles containing a lithium transition metal composite oxide and a deposit disposed on the core particle surface. The deposit may be disposed on at least a region of a portion of the core particle surface, and is preferably disposed in a region of 1% or more of the surface area of the core particles. The composition of the deposit is suitably selected in accordance with the purpose and the like, and examples thereof include oxides and fluorides containing at least one kind selected from the group consisting of B, Na, Mg, Si, P, S, K, Ca, Ti, V, Cr, Zn, Sr, Y, Zr, Nb, Mo, In, Sn, Ba, La, Ce, Nd, Sm, Eu, Gd, Ta, W, and Bi, as well as Li composite oxides thereof. The content of deposit may be, for example, 0.03% by mass or more and 10% by mass or less, and preferably 0.1% by mass or more and 2% by mass or less in the lithium transition metal composite oxide particles.

The lithium transition metal composite oxide includes Ni in the composition. In view of the initial efficiency in a nonaqueous electrolyte secondary battery, the disorder of Ni element of the lithium transition metal composite oxide determined by X-ray diffractometry is preferably 4.0% or less, more preferably 2.0% or less, and still more preferably 1.5% or less. The expression "disorder of Ni element" described herein refers to disorder in chemical arrangement (chemical disorder) of a transition metal ion (Ni ion) which is supposed to occupy the original site. In a lithium transition metal composite oxide having a layered structure, such a disorder is typically an exchange between lithium ions to occupy the site represented by 3b when expressed in the Wyckoff symbol (3b site, the same applies hereinbelow) and transition metal ions to occupy the 3a site. The smaller disorder of Ni element is, the more initial efficiency is improved, and thus is more preferable.

The disorder of Ni element in a lithium transition metal composite oxide can be determined by X-ray diffractometry. The X-ray diffraction spectrum of a lithium transition metal composite oxide is measured by using a CuKα ray. The composition model is represented by $Li_{1-d}Ni_dMeO_2$ (in which Me is transition metals other than nickel in the lithium transition metal composite oxide), and structure optimization is performed by Rietveld analysis based on the obtained X-ray diffraction spectrum. The percentage of d calculated as a result of structure optimization is determined as the disorder value of Ni element.

In a case in which the lithium transition metal composite oxide has a composition represented by the formula (1), in one embodiment of the present invention, the range of a, the ranges of particle diameters represented by DSEM, D50, D90 and D10, and the more preferred range of the disorder of Ni element may vary in accordance with the value of x in the formula (1), and examples thereof will be shown hereinbelow.

In the formula (1), in a case in which x satisfies $0.3 \leq x < 0.8$, in view of the output density, it is preferable that D50/DSEM is 1 or more and 2 or less.

In the formula (1), in a case in which x satisfies $0.3 \leq x < 0.6$, in view of the output density, it is preferable that at least one of the embodiments shown below is satisfied.
  (i) In view of charge/discharge capacity, it is preferable that the disorder of Ni element in the lithium transition metal composite oxide particles determined by X-ray diffractometry is 1.5% or less.
  (ii) It is preferable that D90/D10 is 3.0 or less, and more preferably 2.5 or less.
  (iii) In view of electrode plate filling properties, it is preferable that D50 is 1 μm or more and 5.5 μm or less, and more preferably 1 μm or more and 3 μm or less.
  (iv) It is preferable that a in the formula (1) satisfies $1.1 < a < 1.2$.

In the formula (1), in a case in which x satisfies $0.6 \leq x < 0.8$, in view of the output density, it is preferable that at least one of the embodiments shown below is satisfied.
  (i) In view of charge/discharge capacity, it is preferable that the disorder of Ni element in the lithium transition metal composite oxide particles determined by X-ray diffractometry is 2.0% or less.
  (ii) It is preferable that D90/D10 is 2.3 or less.
  (iii) In view of electrode plate filling properties, it is preferable that D50 is 1 μm or more and 5.5 μm or less.

In the formula (1), in a case in which x satisfies $0.8 \leq x < 0.95$, in view of the output density, it is preferable that at least one of the embodiments shown below is satisfied.
  (i) In view of charge/discharge capacity, it is preferable that the disorder of Ni element in the lithium transition metal composite oxide particles determined by X-ray diffractometry is 4.0% or less.
  (ii) It is preferable that D90/D10 is 3.0 or less.
  (iii) In view of electrode plate filling properties, it is preferable that D50 is 1 μm or more and 5.5 μm or less.

Lithium transition metal composite oxide particles contained in the positive electrode active material according to the present embodiment can be produced by a method including mixing a lithium compound and an oxide having a desired composition to obtain a raw material mixture, and subjecting the obtained raw material mixture to a heat treatment. The heat-treated product obtained after the heat treatment may be subjected to a crushing treatment, and may further be subjected to a treatment for removing unreacted substances, by-products, and the like by washing with water, and the like. Furthermore, the product may further be subjected to a dispersion treatment, a classification treatment, and the like.

Examples of methods of obtaining an oxide having a desired composition include a method in which raw material compounds (hydroxide, carbonate compound, and the like)

are mixed according to the intended composition and decomposed into an oxide by a heat treatment, a co-precipitation method in which a raw material compound soluble in a solvent is dissolved in a solvent, then adjustment of the temperature, adjustment of the pH, or addition of a complexing agent, for example, is performed to obtain a precipitate of a precursor in accordance with the intended composition, and the precursors are subjected to a heat treatment to obtain an oxide, and the like. Hereinbelow, one example of a method of producing a positive electrode active material will be described in a case in which the lithium transition metal composite oxide is represented by the formula (1).

It is preferable that the method of obtaining a raw material mixture includes obtaining a composite oxide containing Ni, Co, and at least one of Mn and Al by a co-precipitation method, and mixing the obtained composite oxide with a lithium compound such as lithium carbonate or lithium hydroxide.

The method of obtaining a composite oxide by a co-precipitation method may include a seed formation step of adjusting the pH and the like of a mixed aqueous solution containing metal ions in a desired composition to obtain seed crystals, a crystallization step of growing the formed seed crystals to obtain a composite hydroxide having desired characteristics, and a step of subjecting the obtained composite hydroxide to a heat treatment to obtain a composite oxide. The details of the method of obtaining a composite oxide may be referred to in Japanese Unexamined Patent Application, Publication No. 2003-292322, Japanese Unexamined Patent Application, Publication No. 2011-116580, and the like.

The composite oxide obtained by a co-precipitation method has a value of D90/D10, which serves as an index of particle size distribution, of 3 or less, for example, preferably 2 or less. In addition, D50 is 12 μm or less, for example, preferably 6 μm or less, and more preferably 4 μm or less, and is 1 μm or more, for example, and preferably 2 μm or more.

The content ratio Ni/Co/(Mn+Al) of Ni, Co, and Mn and Al in the composite oxide may be 1/1/1, 6/2/2, or 8/1/1, for example.

It is preferable that the raw material mixture contains a lithium compound in addition to the composite oxide. Examples of lithium compounds include lithium carbonate, lithium hydroxide, and lithium oxide. The particle diameter of the lithium compound to be used is, as D50, 0.1 to 100 μm, for example, and preferably 2 to 20 μm. The content of lithium with respect to the raw material mixture may be, in terms of Li/(Ni+Co+Mn+Al), 1.0 or more and 1.3 or less, for example, and preferably 1.2 or less. The composite oxide and the lithium compound may be mixed by using a high-speed shear mixer or the like, for example.

The obtained raw material mixture is subjected to a heat treatment, which allows obtainment of lithium transition metal composite oxide particles. The temperature for heat treatment is 700° C. to 1100° C., for example. The heat treatment may be performed at a single temperature, or may also be performed at a plurality of temperatures. In a case in which the heat treatment is performed at a plurality of temperatures, for example, it is possible to perform a first heat treatment at a temperature in a range of 700 to 925° C., and then perform a second heat treatment at a temperature in a range of 930 to 1100° C. Furthermore, a third heat treatment may be additionally performed at a temperature in a range of 700 to 850° C.

The time of the heat treatment is 1 to 40 hours, for example. In a case in which the heat treatment is performed at a plurality of temperatures, each treatment may be performed for 1 to 10 hours. The atmosphere for the heat treatment may be either in air or in an oxygen atmosphere.

The heat-treated product may be subjected to a crushing treatment, a dispersion treatment, a classification treatment, and the like. As a result, desired lithium transition metal composite oxide particles can be obtained.

In addition, after being subjected to a crushing treatment, a dispersion treatment, a classification treatment, or the like, the heat-treated product may be further mixed with a lithium compound to obtain a mixture, followed by an additional heat treatment. In a case in which a lithium compound is further mixed, the content of lithium in the mixture may be, for example, represented in terms of Li/(Ni+Co+Mn+Al), 1.05 to 1.3, and preferably 1.1 to 1.2. In addition, the additional heat treatment may be performed at a temperature in a range of 850 to 1000° C., preferably in a range of 870 to 950° C., and it is preferable that the temperature be lower than the temperature of the heat treatment of the raw material mixture. The heat treatment time of the additional heat treatment may be, for example, 2 to 15 hours. After the additional heat treatment, a crushing treatment, a dispersion treatment, a classification treatment, or the like may be performed.

[Nonaqueous Electrolyte Secondary Battery]

The nonaqueous electrolyte secondary battery according to the present embodiment is provided with the electrode for nonaqueous electrolyte secondary batteries described above as a positive electrode. Furthermore, other than having a conventionally known negative electrode for nonaqueous electrolyte secondary batteries as a negative electrode, the nonaqueous electrolyte secondary battery according to the present embodiment is constituted by including a nonaqueous electrolyte, a separator, or the like.

As the negative electrode for nonaqueous electrolyte secondary batteries, nonaqueous electrolyte, separator, and the like, those described in Japanese Unexamined Patent Application, Publication No. 2002-075367, Japanese Unexamined Patent Application, Publication No. 2011-146390, Japanese Unexamined Patent Application, Publication No. 2006-12433, and the like may be suitably used, for example, and the production methods described in those publications can be also used as a method for production.

Furthermore, the present invention is not limited to the above modes for carrying out the invention, and modifications and improvements within a range in which the object of the present invention is achieved are also encompassed by the present invention.

EXAMPLES

Next, Examples of the present invention are described. However, the present invention is not limited to the following Examples.

Preparation Example 1 of Positive Electrode Active Material (Seed Forming Step)

First, 10 kg of water was charged in a reaction tank, and, under stirring, the ammonium ion concentration was adjusted to 1.8% by mass. The temperature in the tank was set at 25° C., and a nitrogen gas was circulated in the tank to maintain the oxygen concentration of the inner space of the reaction tank at 10% by volume or less. A 25% by mass aqueous sodium hydroxide solution was added to water in the reaction tank, and the pH value of the solution in the tank was adjusted to 13.5 or higher. Next, a nickel sulfate solution, a cobalt sulfate solution, and a manganese sulfate solution were mixed to prepare a mixed aqueous solution having a molar ratio of 1:1:1. The mixed aqueous solution was added until the solute content reached 4 mol, and, while controlling the pH value of the reaction solution at 12.0 or higher with a sodium hydroxide solution, seed formation was carried out.

(Crystallization Step)

After the seed forming step, the temperature in the tank was maintained at 25° C. or higher until the completion of the crystallization step. In addition, a mixed aqueous solution having a solute content of 1200 mol was prepared and added to the reaction tank over 5 hours or more simultaneously with an aqueous ammonia solution while maintaining the ammonium ion concentration in the solution at 2000 ppm or more so that no additional seed formation would take place in the reaction tank. During the reaction, the pH value of the reaction solution was controlled to be maintained at 10.5 to 12.0 with a sodium hydroxide solution. Sampling was successively performed during the reaction, and the addition was completed when D50 of the composite hydroxide particles reached 4.5 μm or so. Next, the product was washed with water, filtered, and dried, so that composite hydroxide particles were obtained. The obtained hydroxide precursor was subjected to a heat treatment at 300° C. for 20 hours in the ambient atmosphere, thereby obtaining a composite oxide having the following properties: composition ratio Ni/Co/Mn=0.33/0.33/0.33, D10=3.4 μm, D50=4.5 μm, D90=6.0 μm, and D90/D10=1.8.

(Synthesis Step)

The obtained composite oxide and lithium carbonate were mixed so that Li/(Ni+Co+Mn) becomes 1.15 to obtain a raw material mixture. The obtained raw material mixture was calcined in air at 925° C. for 7.5 hours and then calcined at 1030° C. for 6 hours to obtain a sintered product. The obtained sintered product was crushed, subjected to, for 10 minutes, a dispersion treatment in a ball mill made of resin, and then dry-sieved to obtain a powder. The obtained powder was classified through a dry classifier into three sizes (large, medium, and small), and medium-sized particles were collected. The proportion of medium-sized particles after classification relative to before classification was 46% by weight. According to the above, lithium transition metal composite oxide particles represented by the composition formula of $Li_{1.15}Ni_{0.33}Co_{0.33}Mn_{0.33}O_2$ and having the following properties were obtained: average particle diameter DSEM based on electron microscopic observation is 3.6 μm, D10=3.7 μm, D50=5.1 μm, D90=6.7 μm, ratio D50/DSEM of D50 to average particle diameter DSEM is 1.4, ratio D90/D10 in particle size distribution is 1.8, and amount of Ni disorder is 0.3%.

Preparation Example 2 of Positive Electrode Active Material

Under the same conditions as in Preparation Example 1 except that the timing of the completion of addition of a mixed aqueous solution in the crystallization step was changed to the time at which the value of D50 of composite hydroxide particles reached about 3.0 μm, a composite oxide having the following properties was obtained: composition ratio Ni/Co/Mn=0.33/0.33/0.33, D10=2.2 μm, D50=3.0 μm, D90=4.1 μm, and D90/D10=1.9. The obtained composite oxide and lithium carbonate were mixed so that Li/(Ni+Co+Mn) becomes 1.05 to obtain a raw material mixture. The obtained raw material mixture was calcined in air at 925° C. for 7.5 hours and then calcined at 1030° C. for 6 hours to obtain a sintered product. The obtained sintered product was crushed, subjected to, for 30 minutes, a dispersion treatment in a ball mill made of resin, and then dry-sieved to obtain a powder. The obtained powder and lithium carbonate were mixed so that Li/(Ni+Co+Mn) becomes 1.17 and calcined in air at 900° C. for 10 hours to obtain a sintered product. The obtained sintered product was crushed, subjected to, for 30 minutes, a dispersion treatment in a ball mill made of resin, and then dry-sieved to obtain a powder. According to the above, lithium transition metal composite oxide particles represented by the composition formula of $Li_{1.17}Ni_{0.33}Co_{0.33}Mn_{0.33}O_2$ and having the following properties were obtained: average particle diameter DSEM is 1.2 μm, D10=1.5 μm, D50=3.3 μm, D90=5.1 μm, ratio D50/DSEM of D50 to average particle diameter DSEM is 2.8, ratio D90/D10 in particle size distribution is 3.4, and amount of Ni disorder is 0.9%.

Preparation Example 3 of Positive Electrode Active Material

A composite oxide was obtained under the same conditions as in Preparation Example 2. The obtained composite oxide and lithium carbonate were mixed so that Li/(Ni+Co+Mn) becomes 1.05 to obtain a raw material mixture. The obtained raw material mixture was calcined in air at 925° C. for 7.5 hours and then calcined at 1030° C. for 6 hours to obtain a sintered product. The obtained sintered product was crushed, subjected to, for 30 minutes, a dispersion treatment in a ball mill made of resin, and then dry-sieved to obtain a powder. The obtained powder and lithium carbonate were mixed so that Li/(Ni+Co+Mn) becomes 1.17 and calcined in air at 900° C. for 10 hours to obtain a sintered product. The obtained sintered product was crushed, subjected to a dispersion treatment twice using a jet mill with the feed pressure adjusted to 0.4 MPa and the grinding pressure adjusted to 0.55 MPa so as to prevent the primary particles from being ground, and then dry-sieved to obtain a powder. According to the above, lithium transition metal composite oxide particles represented by the composition formula of $Li_{1.17}Ni_{0.33}Co_{0.33}Mn_{0.33}O_2$ and having the following properties were obtained: average particle diameter DSEM is 1.4 μm, D10=1.1 μm, D50=1.9 μm, D90=2.8 μm, ratio D50/DSEM of D50 to average particle diameter DSEM is 1.4, ratio D90/D10 in particle size distribution is 2.5, and amount of Ni disorder is 1.0%.

Preparation Example 4 of Positive Electrode Active Material

A composite oxide was obtained under the same conditions as in Preparation Example 2. The obtained composite oxide and lithium carbonate were mixed so that Li/(Ni+Co+Mn) becomes 1.05 to obtain a raw material mixture. The obtained raw material mixture was calcined in air at 925° C. for 7.5 hours and then calcined at 1030° C. for 6 hours to obtain a sintered product. The obtained sintered product was crushed, subjected to, for 10 minutes, a dispersion treatment in a ball mill made of resin, and then dry-sieved to obtain a powder. The obtained powder and lithium carbonate were mixed so that Li/(Ni+Co+Mn) becomes 1.14 and calcined in air at 900° C. for 10 hours to obtain a sintered product. The obtained sintered product was crushed, subjected to, for 10 minutes, a dispersion treatment in a ball mill made of resin, and then dry-sieved to obtain a powder. According to the above, lithium transition metal composite oxide particles represented by the composition formula of $Li_{1.14}Ni_{0.33}Co_{0.33}Mn_{0.33}O_2$ and having the following properties were obtained: average particle diameter DSEM is 1.25 µm, D10=2.7 µm, D50=4.5 µm, D90=6.7 µm, ratio D50/DSEM of D50 to average particle diameter DSEM of primary particles is 3.6, ratio D90/D10 in particle size distribution is 2.5, and amount of Ni disorder is 1.0%.

Preparation Example 5 of Positive Electrode Active Material

A composite oxide was obtained under the same conditions as in Preparation Example 2. The obtained composite oxide and lithium carbonate were mixed so that Li/(Ni+Co+Mn) becomes 1.15 to obtain a raw material mixture. The obtained raw material mixture was calcined in air at 950° C. for 15 hours to obtain a sintered product. The obtained sintered product was crushed, subjected to, for 10 minutes, a dispersion treatment in a ball mill made of resin, and then dry-sieved to obtain a powder. According to the above, lithium transition metal composite oxide particles represented by the composition formula of $Li_{1.15}Ni_{0.33}Co_{0.33}Mn_{0.33}O_2$ and having the following properties were obtained: average particle diameter DSEM is 0.49 µm, D10=3.0 µm, D50=4.4 µm, D90=7.6 µm, ratio D50/DSEM of D50 to average particle diameter DSEM is 9.0, ratio D90/D10 in particle size distribution is 2.5, and amount of Ni disorder is 0.9%.

Preparation Example 6 of Positive Electrode Active Material

Under the same conditions as in Preparation Example 1, except that the mixing ratio of a nickel sulfate solution, a cobalt sulfate solution, and a manganese sulfate solution was changed to a molar ratio of 8:1:1 to obtain a mixed aqueous solution, and that the timing of the completion of addition of the mixed aqueous solution in the crystallization step was changed to the time at which D50 of composite hydroxide particles reached 3.2 µm, a composite oxide having the following properties was obtained: composition ratio Ni/Co/Mn=0.80/0.10/0.10, D10=2.2 µm, D50=2.9 µm, D90=4.0 µm, D90/D10=1.8. The obtained composite oxide and lithium hydroxide monohydrate were mixed so that Li/(Ni+Co+Mn) becomes 1.04 to obtain a raw material mixture. The obtained raw material mixture was calcined in an oxygen stream at 780° C. for 5 hours, then calcined at 900° C. for 10 hours, and further calcined at 780° C. for 5 hours to obtain a sintered product. The obtained sintered product was crushed and subjected to a dispersion treatment in a ball mill made of resin for 10 minutes to obtain a powder. Further, the powder and 10% by mass of water with respect to the powder were added to a high-speed stirring mixer equipped with a rotating blade, and the mixture was stirred at 2000 rpm to elute the residual alkali from the particle boundaries and perform a dispersion treatment, dried at 350° C., and then dry-sieved to obtain a powder. According to the above, lithium transition metal composite oxide particles represented by the composition formula of $Li_{1.04}Ni_{0.80}Co_{0.10}Mn_{0.10}O_2$ and having the following properties were obtained: average particle diameter DSEM is 1.5 µm, D10=2.2 µm, D50=3.6 µm, D90=6.0 µm, ratio D50/DSEM of D50 to average particle diameter DSEM is 2.4, ratio D90/D10 in particle size distribution is 2.7, and amount of Ni disorder is 1.6%.

<Evaluation>

By using the lithium transition metal composite oxides of each Preparation Example which have been obtained as above as a positive electrode active material, a battery for evaluation was produced in the following order.

First, 96 parts by mass of each positive electrode active material which has been obtained as described above, 3 parts by mass of acetylene black, and 1 part by mass of polyvinylidene fluoride (PVDF) were dispersed in N-methyl-2-pyrrolidone (NMP) to prepare a positive electrode mixture. The obtained positive electrode mixture was applied to an aluminum foil that serves as a collector, dried, then compression-molded using a roll press, and cut into a predetermined size, so that a positive electrode was produced.

Lead electrodes were attached to each of the positive electrode which has been obtained as described above and graphite as the negative electrode, and then a separator was placed between the positive electrode and the negative electrode, and they were housed in a bag-shaped laminate pack. As a separator, a PE separator with thickness of 16 µm was used. Subsequently, the laminate pack was vacuum-dried at 65° C. to remove the moisture adsorbed on each member. After that, in an argon atmosphere, an electrolyte liquid was injected into the laminate pack followed by sealing.

The battery thus obtained was placed in a thermostat at 25° C. and aged under a weak current. For the electrolyte liquid, a solution prepared by adding 1.5% by mass of vinylene carbonate (VC) to a mixture of ethylene carbonate (EC), ethyl methyl carbonate (EMC), and dimethyl carbonate (DMC) at a volume ratio of 3:3:4, and then dissolving lithium hexafluorophosphate (LiPF6) to a concentration of 1.2 mol/l, was used.

D10, D50, and D90 of each positive electrode active material were determined by, with use of a laser diffraction particle size distribution analyzer (SALD-3100 manufactured by SHIMADZU CORPORATION), measuring volume-based cumulative particle size distribution, and obtaining each particle diameter corresponding to the cumulative value from the smaller particle diameter side.

The DSEM of each positive electrode active material was determined as follows; a scanning electron microscope (SEM) was used, and in an image observed at a magnification of 1000 to 10000, one hundred particles having recognizable outlines were selected, and the equivalent spherical diameters of the selected particles were calculated using an image processing software (Image J), and the arithmetic average of the obtained equivalent spherical diameters was determined as DSEM.

The value of nickel element disorder (amount of Ni disorder) was determined by X-ray diffractometry in the following order. The X-ray diffraction spectrum of obtained lithium transition metal composite oxide particles was measured by using a CuKα ray. With the composition model being expressed as $Li_{1-d}Ni_dMeO_2$ (in which Me is transition metals other than nickel in the lithium transition metal composite oxide), based on the obtained X-ray diffraction spectrum, the structure optimization of the lithium transition metal composite oxide was carried out by Rietveld analysis. The percentage of d calculated as a result of structure optimization was determined as the amount of Ni disorder.

By using mercury intrusion porosimetry, a void fraction, a peak diameter of a void, and an average diameter of a void were measured. The diameter range having diameter of more than about 5 µm was assumed as a measurement noise, and thus cut. The density was obtained from electrode weight and electrode volume.

Furthermore, the output density was evaluated for the batteries for evaluation which have been obtained as described above. Specifically, the battery for evaluation was discharged to set it in a 50% SOC state, and then it was maintained under an environment at 25° C. for 2 hours. Subsequently, from the 50% SOC state, the battery was discharged at a constant current, the DC resistance after 10 seconds was measured, and the output density was calculated. Furthermore, the lower limit of discharge voltage was set at 2.7 V. The results are shown in Table 1.

TABLE 1

| | Positive electrode active material | DSEM (μm) | D10 (μm) | D50 (μm) | D90 (μm) | D50/ DSEM | D90/ D10 | Amount of Ni disorder (%) | Void fraction (%) | Peak diameter (μm) | Average diameter (μm) | Peak diameter/ Average diameter | Density (g/cm3) | Output density (W/kg) |
|---|---|---|---|---|---|---|---|---|---|---|---|---|---|---|
| Example 1 | Preparation Example 3 | 1.4 | 1.1 | 1.9 | 2.8 | 1.4 | 2.3 | 1.0 | 39 | 0.30 | 0.20 | 1.5 | 2.4 | 3700 |
| Example 2 | | | | | | | | | 35 | 0.25 | 0.16 | 1.6 | 2.7 | 10220 |
| Example 3 | | | | | | | | | 24 | 0.18 | 0.14 | 1.3 | 3.0 | 11430 |
| Example 4 | | | | | | | | | 19 | 0.13 | 0.10 | 1.3 | 3.3 | 11510 |
| Example 5 | | | | | | | | | 14 | 0.09 | 0.08 | 1.1 | 3.6 | 11380 |
| Example 6 | | | | | | | | | 10 | 0.08 | 0.06 | 1.3 | 3.9 | 11445 |
| Example 7 | Preparation Example 2 | 1.2 | 1.5 | 3.3 | 5.1 | 2.8 | 3.4 | 0.9 | 42 | 0.28 | 0.18 | 1.6 | 2.4 | 3800 |
| Example 8 | | | | | | | | | 57 | 0.24 | 0.14 | 1.7 | 2.7 | 8090 |
| Example 9 | | | | | | | | | 26 | 0.20 | 0.13 | 1.5 | 3.0 | 9630 |
| Example 10 | | | | | | | | | 21 | 0.14 | 0.08 | 1.8 | 3.3 | 9880 |
| Example 11 | | | | | | | | | 17 | 0.09 | 0.06 | 1.5 | 3.6 | 9220 |
| Example 12 | | | | | | | | | 10 | 0.08 | 0.05 | 1.6 | 3.9 | 9110 |
| Comparative Example 1 | | | | | | | | | 3 | 0.08 | 0.03 | 2.7 | 4.0 | 5420 |
| Comparative Example 2 | Preparation Example 1 | 3.6 | 3.7 | 5.1 | 6.7 | 1.4 | 1.8 | 0.3 | 46 | 0.32 | 0.22 | 1.5 | 2.4 | 3600 |
| Example 13 | | | | | | | | | 45 | 0.28 | 0.18 | 1.6 | 2.7 | 8560 |
| Example 14 | | | | | | | | | 30 | 0.21 | 0.16 | 1.3 | 3.0 | 9040 |
| Example 15 | | | | | | | | | 24 | 0.18 | 0.14 | 1.3 | 3.3 | 9120 |
| Example 16 | | | | | | | | | 20 | 0.15 | 0.11 | 1.4 | 3.6 | 8840 |
| Example 17 | | | | | | | | | 14 | 0.12 | 0.10 | 1.2 | 3.9 | 8620 |
| Comparative Example 3 | | | | | | | | | 8 | 0.10 | 0.04 | 2.5 | 4.0 | 4450 |
| Example 18 | Preparation Example 4 | 1.25 | 2.7 | 4.5 | 6.7 | 3.6 | 2.5 | 1.0 | 40 | 0.34 | 0.16 | 2.1 | 2.4 | 4300 |
| Example 19 | | | | | | | | | 36 | 0.28 | 0.12 | 2.3 | 2.7 | 7420 |
| Example 20 | | | | | | | | | 25 | 0.20 | 0.09 | 2.2 | 3.0 | 7630 |
| Example 21 | | | | | | | | | 21 | 0.15 | 0.07 | 2.1 | 3.3 | 6720 |
| Example 22 | | | | | | | | | 16 | 0.12 | 0.05 | 2.4 | 3.6 | 6521 |
| Example 23 | | | | | | | | | 12 | 0.09 | 0.04 | 2.3 | 3.9 | 6310 |
| Comparative Example 4 | | | | | | | | | 8 | 0.09 | 0.03 | 3.0 | 4.0 | 4221 |
| Comparative Example 5 | Preparation Example 5 | 0.49 | 3.0 | 4.4 | 7.6 | 9.0 | 2.5 | 0.9 | 40 | 0.34 | 0.12 | 2.8 | 2.4 | 4330 |
| Comparative Example 6 | | | | | | | | | 35 | 0.29 | 0.10 | 2.9 | 2.7 | 5950 |
| Comparative Example 7 | | | | | | | | | 26 | 0.21 | 0.07 | 3.0 | 3.0 | 6320 |
| Comparative Example 8 | | | | | | | | | 20 | 0.15 | 0.05 | 3.0 | 3.3 | 4440 |
| Comparative Example 9 | | | | | | | | | 14 | 0.13 | 0.04 | 3.3 | 3.6 | 3110 |
| Comparative Example 10 | | | | | | | | | 10 | 0.12 | 0.03 | 4.0 | 3.9 | 2580 |
| Comparative Example 11 | | | | | | | | | 8 | 0.11 | 0.03 | 3.7 | 4.0 | 2110 |
| Example 24 | Preparation Example 6 | 1.5 | 2.2 | 3.6 | 6 | 2.4 | 2.7 | 1.6 | 40 | 0.28 | 0.18 | 1.6 | 2.4 | 3200 |
| Example 25 | | | | | | | | | 37 | 0.24 | 0.14 | 1.7 | 2.8 | 11200 |
| Example 26 | | | | | | | | | 26 | 0.20 | 0.13 | 1.5 | 3.0 | 11700 |
| Example 27 | | | | | | | | | 21 | 0.12 | 0.08 | 1.5 | 3.3 | 12200 |
| Example 28 | | | | | | | | | 17 | 0.09 | 0.06 | 1.5 | 3.6 | 12000 |
| Example 29 | | | | | | | | | 12 | 0.06 | 0.03 | 2.0 | 3.9 | 12110 |
| Comparative Example 12 | | | | | | | | | 8 | 0.06 | 0.02 | 3.0 | 4.0 | 5560 |

Figure 6:
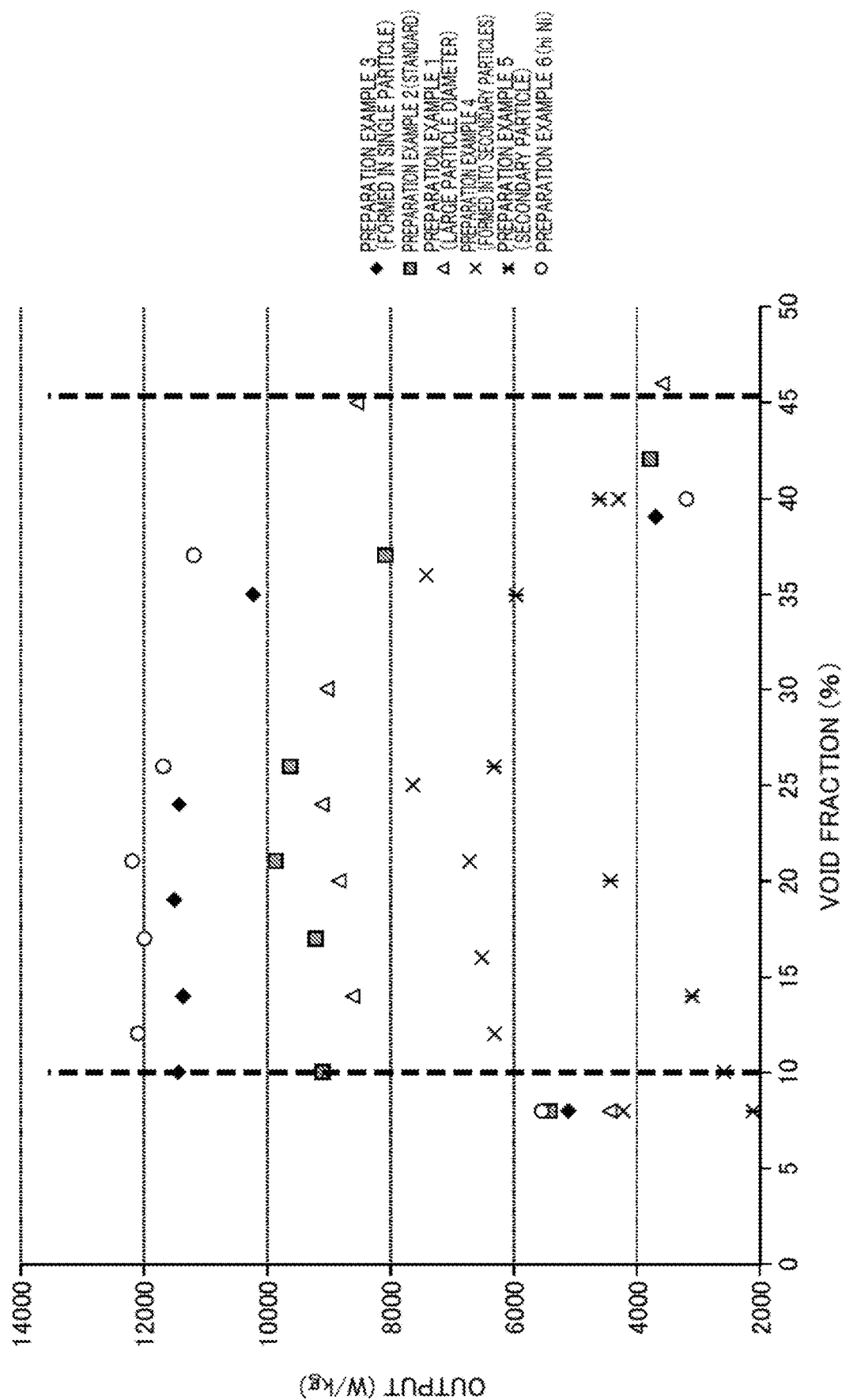
FIG. 6 is a graph showing the relationship between a void fraction of a positive electrode active material layer of Examples and Comparative Examples and an output.
Figure 7:
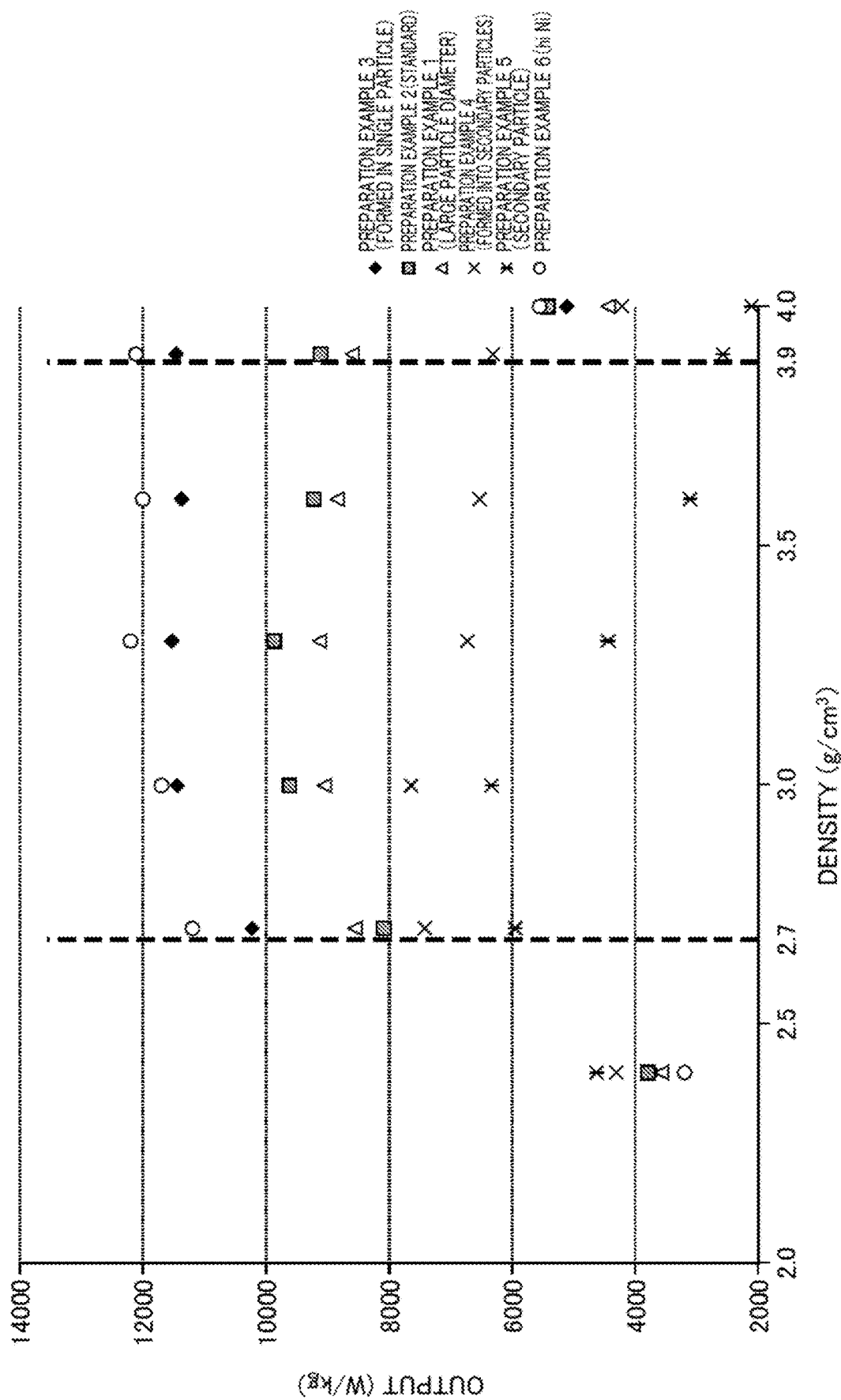
FIG. 7 is a graph showing the relationship between density of the positive electrode active material layer of Examples and Comparative Examples and the output.
Figure 8:
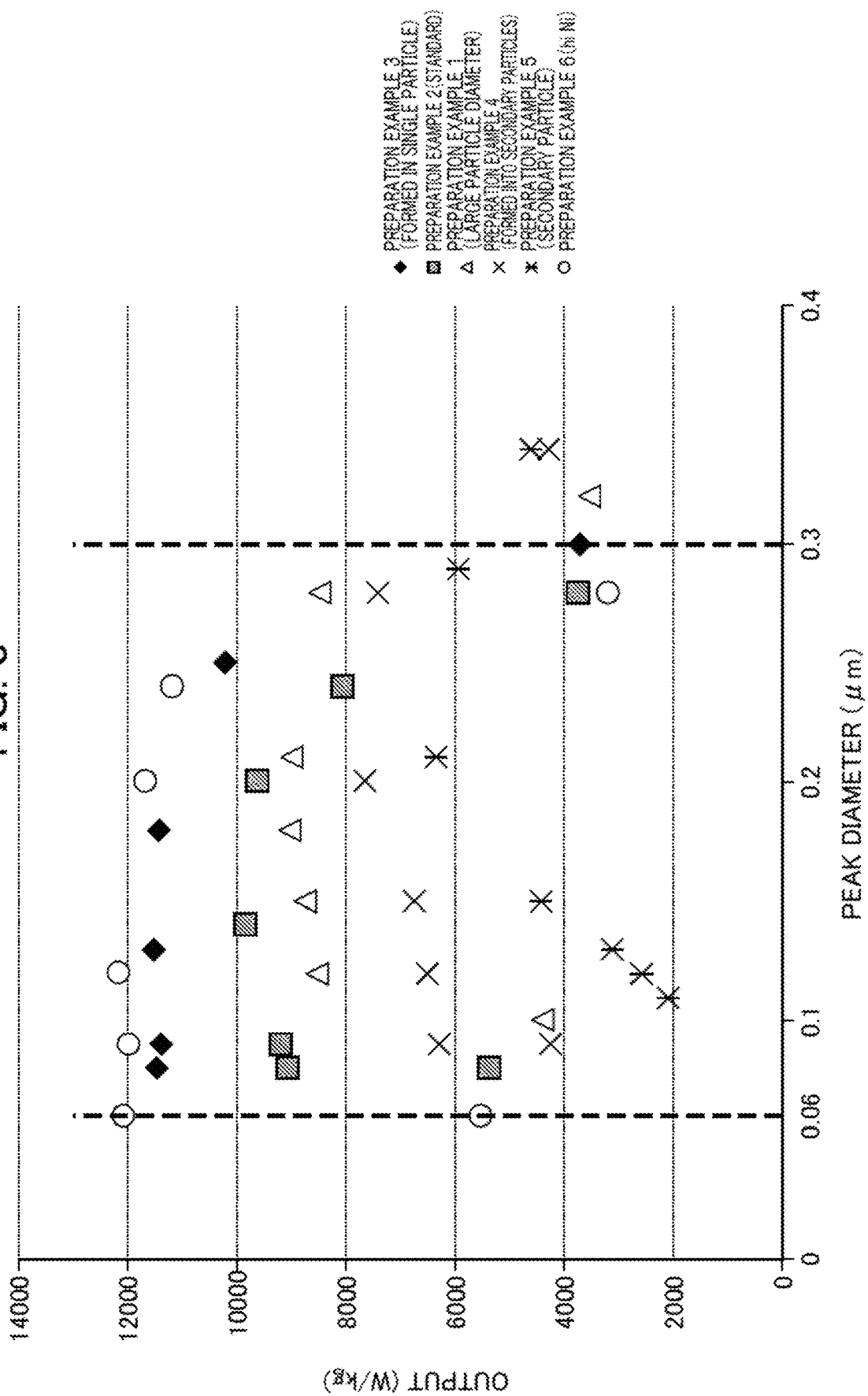
FIG. 8 is a graph showing the relationship between a peak diameter of a void in a void distribution curve of the positive electrode active material layer of Examples and Comparative Examples and the output.
Figure 9:
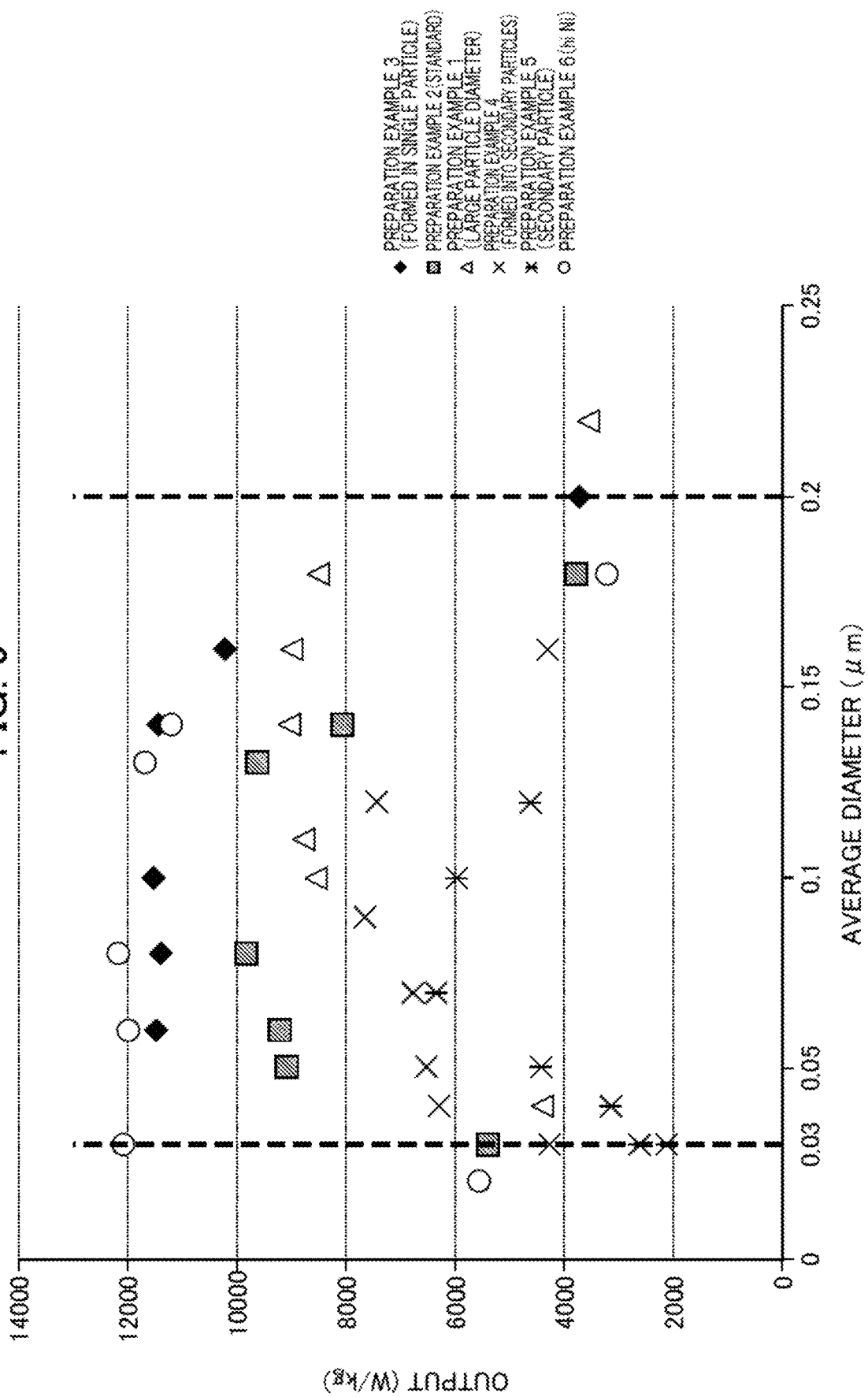
FIG. 9 is a graph showing the relationship between an average diameter of the void of the positive electrode active material layer of Examples and Comparative Examples and the output.
Figure 10:
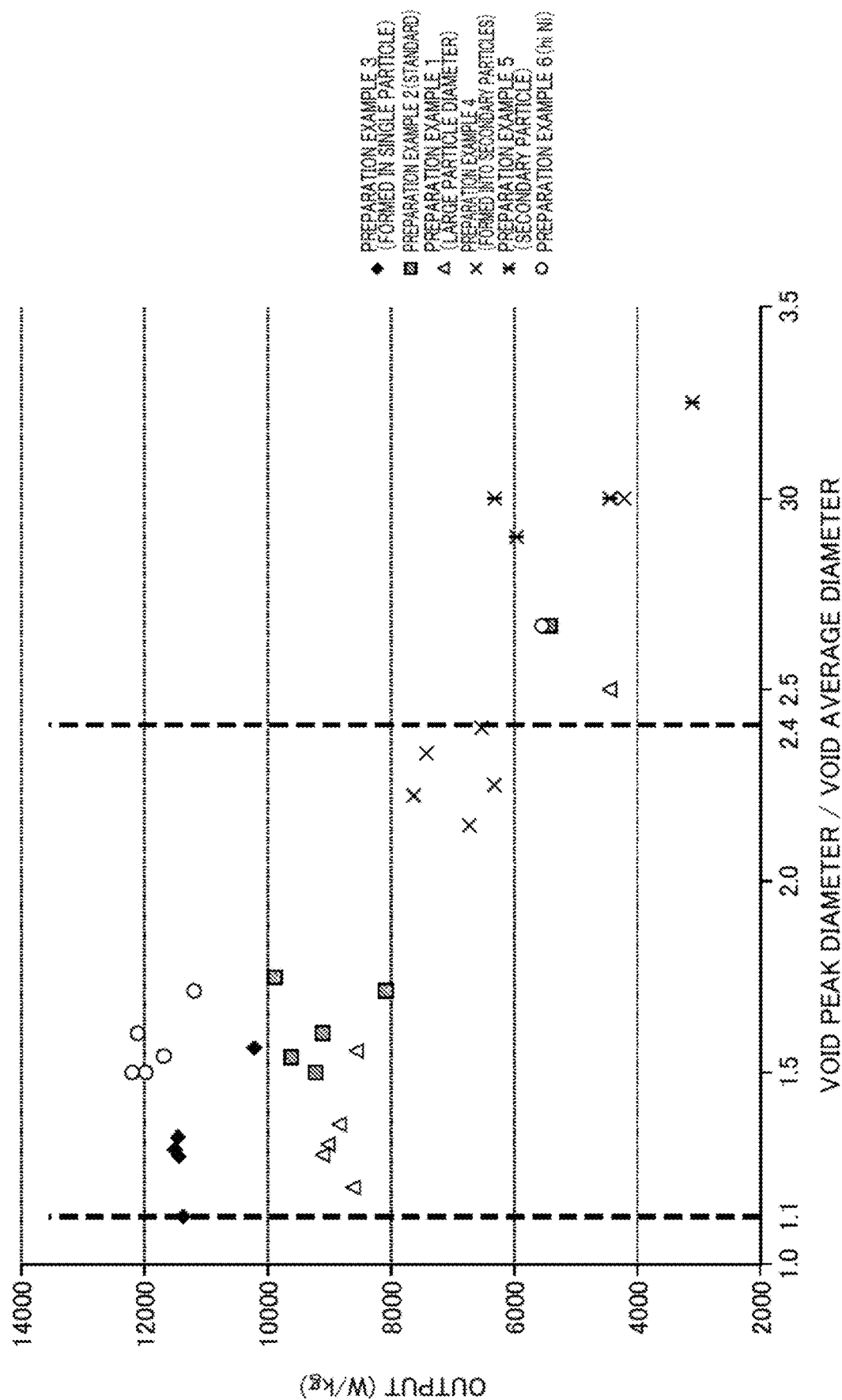
FIG. 10 is a graph showing the relationship between a peak diameter/average diameter of the void of the positive electrode active material of Examples and Comparative Examples and the output.

Furthermore, results of each evaluation are summarized in FIG. 6 to FIG. 10. FIG. 6 is a graph showing the relationship between the void fraction of the positive electrode active material layer of Examples and Comparative Examples and the output. FIG. 7 is a graph showing the relationship between the density of the positive electrode active material layer of Examples and Comparative Examples and the output. FIG. 8 is a graph showing the relationship between the peak diameter of a void in a void distribution curve of the positive electrode active material layer of Examples and Comparative Examples and the output. FIG. 9 is a graph showing the relationship between the average diameter of a void of the positive electrode active material layer of Examples and Comparative Examples and the output. FIG. 10 is a graph showing the relationship between the peak diameter/average diameter of a void of the positive electrode active material of Examples and Comparative Examples and the output.

As it is shown in Table 1, it was confirmed that Examples 1 to 29 have higher output density compared to Comparative Examples 1 to 12. In FIG. 6, the horizontal axis represents a void fraction (%) and the vertical axis represents an output (W/kg). From FIG. 6, it is confirmed that, as the void fraction of a positive electrode active material layer is 10 to 45%, high output characteristics are obtained. In FIG. 7, the horizontal axis represents density (g/cm$^3$) and the vertical axis represents the output (W/kg). From FIG. 7, it is confirmed that, as the density of a positive electrode active material layer is 2.7 to 3.9 g/cm$^3$, high output characteristics are obtained. In FIG. 8, the horizontal axis represents a peak diameter (μm) and the vertical axis represents the output (W/kg). From FIG. 8, it is confirmed that, as the peak diameter of a void in a void distribution curve is 0.06 to 0.3 μm, high output characteristics are obtained. In FIG. 9, the horizontal axis represents an average diameter (μm) and the vertical axis represents the output (W/kg). From FIG. 9, it is confirmed that, as the average diameter of a void is 0.03 to 0.2 μm, high output characteristics are obtained. In FIG. 10, the horizontal axis represents a void peak diameter/void average diameter and the vertical axis represents the output (W/kg). From FIG. 10, it is confirmed that, as the ratio of a peak diameter of a void to an average diameter of a void (peak diameter/average diameter) is 1.1 to 2.4, high output characteristics are obtained.

INDUSTRIAL APPLICABILITY

From the viewpoint of having excellent output density and durability, the nonaqueous electrolyte secondary battery provided with the electrode for nonaqueous electrolyte secondary batteries using the positive electrode active material of the present disclosure can be suitably used for large-sized power machines such as electric vehicles.

The invention claimed is:

1. An electrode for nonaqueous electrolyte secondary batteries comprising:
a collector; and
a positive electrode active material layer that is arranged on the collector and contains a positive electrode active material,
wherein the positive electrode active material comprises lithium transition metal composite oxide particles represented by the following formula (1),
wherein the particles have:
a layered structure composed of two or more transition metals,
an arithmetic average particle diameter DSEM of 1.1 to 7 μm based on an observation with an electron microscope,
50% particle diameter D50 in a volume-based cumulative particle size distribution of 1 to 3.3 μm, the volume-based cumulative particle size distribution being measured using a laser diffraction particle size distribution analyzer,
a ratio of the 50% particle diameter D50 in the volume-based cumulative particle size distribution to the arithmetic average particle diameter DSEM (D50/DSEM) of 1 to 4, and
a ratio of the 90% particle diameter D90 in the volume-based cumulative particle size distribution to the 10% particle diameter D10 in the volume-based cumulative particle size distribution (D90/D10) of 4 or less, and
the positive electrode active material layer has a void fraction of 10 to 37%, and
in the positive electrode active material layer, an average diameter of a void is 0.03 to 0.2 μm, $$Li_pNi_xCo_yM^1_zO_{2+\alpha} \qquad \text{Formula (1)}$$

in the formula (1), p, x, y, z, and α satisfy 1.0≤p≤1.3, 0.3≤x<0.6, 0≤y≤0.4, 0≤z≤0.5, x+y+z=1, and −0.1≤α≤0.1, and M$^1$ represents at least one of Mn and Al.

2. An electrode for nonaqueous electrolyte secondary batteries comprising:
a collector; and
a positive electrode active material layer that is arranged on the collector and contains a positive electrode active material,
wherein the positive electrode active material comprises lithium transition metal composite oxide particles represented by the following formula (1),
wherein the particles have:
a layered structure composed of two or more transition metals,
an arithmetic average particle diameter DSEM of 1.1 to 7 μm based on an observation with an electron microscope,
a ratio of the 50% particle diameter D50 in a volume-based cumulative particle size distribution to the arithmetic average particle diameter DSEM (D50/DSEM) of 1 to 4, the volume-based cumulative particle size distribution being measured using a laser diffraction particle size distribution analyzer, and
a ratio of the 90% particle diameter D90 in the volume-based cumulative particle size distribution to the 10% particle diameter D10 in the volume-based cumulative particle size distribution (D90/D10) of 4 or less, and
the positive electrode active material layer has a void fraction of 12 to 37%, and
in the positive electrode active material layer, an average diameter of a void is 0.03 to 0.2 μm, $$Li_pNi_xCo_yM^1_zO_{2+\alpha} \qquad \text{Formula (1)}$$

in the formula (1), p, x, y, z, and α satisfy 1.0≤p≤1.3, 0.6≤x<0.95, 0≤y≤0.4, 0≤z≤0.5, x+y+z=1, and −0.1≤α≤0.1, and M$^1$ represents at least one of Mn and Al.

3. The electrode for nonaqueous electrolyte secondary batteries according to claim 1, wherein the positive electrode active material layer has density of 2.7 to 3.9 g/cm$^3$.

4. The electrode for nonaqueous electrolyte secondary batteries according to claim 2, wherein the positive electrode active material layer has density of 2.7 to 3.9 g/cm$^3$.

5. The electrode for nonaqueous electrolyte secondary batteries according to claim 1, wherein, in the positive electrode active material layer, a peak diameter of a void in a void distribution curve is 0.06 to 0.3 μm.

6. The electrode for nonaqueous electrolyte secondary batteries according to claim 2, wherein, in the positive electrode active material layer, a peak diameter of a void in a void distribution curve is 0.06 to 0.3 μm.

7. The electrode for nonaqueous electrolyte secondary batteries according to claim 1, wherein, in the positive electrode active material layer, a ratio of a peak diameter of a void to the average diameter of the void (peak diameter/average diameter) is 1.1 to 2.4.

8. The electrode for nonaqueous electrolyte secondary batteries according to claim 2, wherein, in the positive electrode active material layer, a ratio of a peak diameter of a void to the average diameter of the void (peak diameter/average diameter) is 1.1 to 2.4.

9. The electrode for nonaqueous electrolyte secondary batteries according to claim 1, wherein the positive electrode active material contains Ni, Mn, or Al as a main component.

10. The electrode for nonaqueous electrolyte secondary batteries according to claim 2, wherein the positive electrode active material contains Ni, Mn, or Al as a main component.

11. A nonaqueous electrolyte secondary battery comprising the electrode for nonaqueous electrolyte secondary batteries described in claim 1.

12. A nonaqueous electrolyte secondary battery comprising the electrode for nonaqueous electrolyte secondary batteries described in claim 2.

* * * * *